M. H. MANSFIELD.
Clover Huller.
No. 4,558.
Patented June 6, 1846.
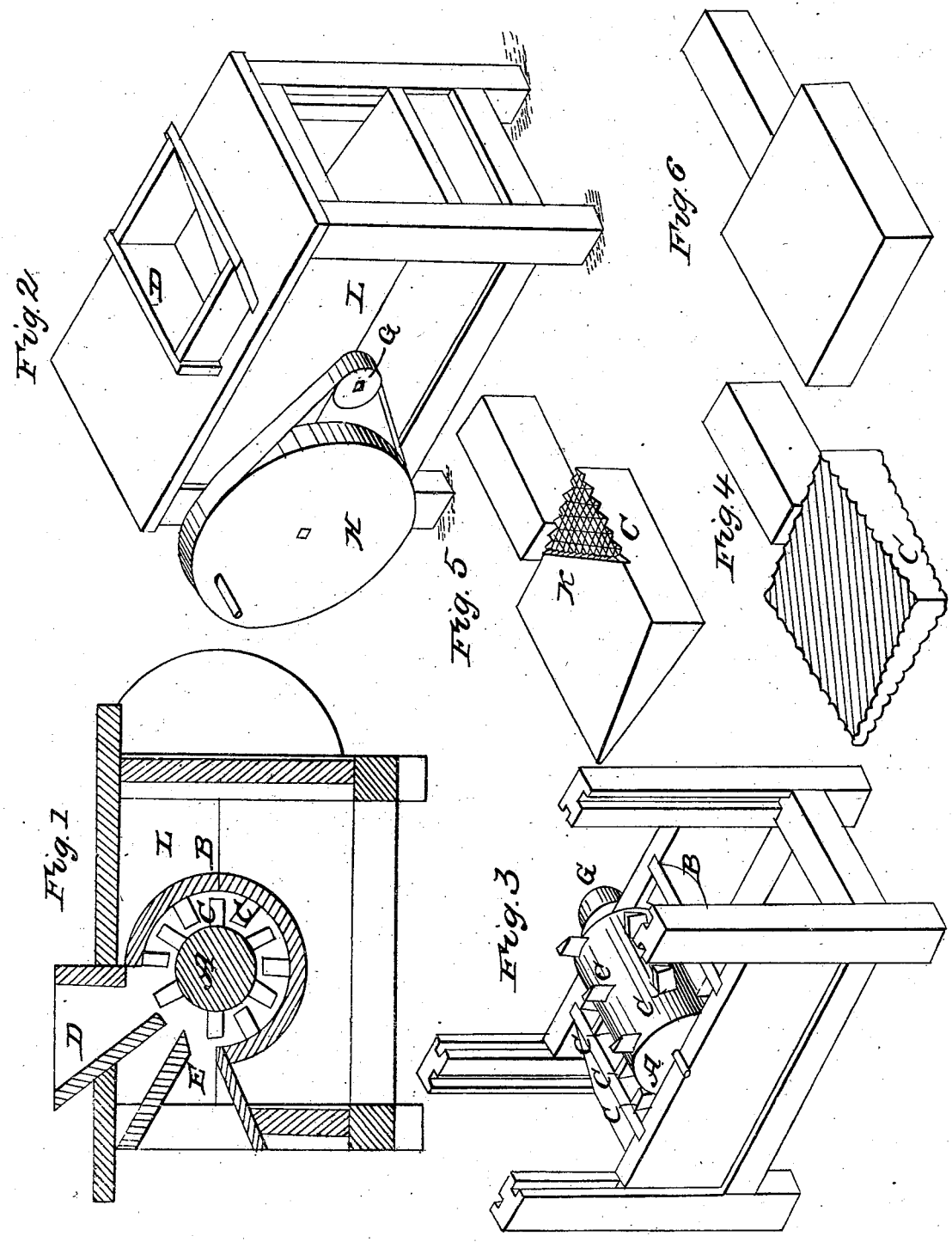

UNITED STATES PATENT OFFICE.

MARTIN H. MANSFIELD, OF MIFFLINTOWN, PENNSYLVANIA.

CLOVER-HULLING MACHINE.

Specification of Letters Patent No. 4,558, dated June 6, 1846.

*To all whom it may concern:*

Be it known that I, MARTIN H. MANSFIELD, of Mifflintown, in the county of Juniata and State of Pennsylvania, have invented an Improved Machine for Hulling Clover-Seed and Rice; and I do hereby declare the following to be a full and exact description thereof, reference being had to the accompanying drawings, making a part of this specification.

Figure 1 is a vertical longitudinal section; Fig. 2, is a perspective elevation; Fig. 3, is a perspective view of my clover seed huller, with a portion of the sides, one end and the top covering removed, for the purpose of showing the arrangement of the rubbers on the cylinder and concave; Figs. 4, 5, and 6, are different forms of rubbers which I make use of to be placed on the cylinder A, and in the concave B, as represented in Fig. 3.

The nature of my invention consists in the form and surface of the rubbers C, C, and the manner of arranging them on the cylinder A, and in the concave B, as represented in the drawings and hereinafter described.

The frame for the reception of the concave B, and cylinder A, is constructed in the usual manner of posts and cross pieces, the plank covering of the sides and ends is let into grooves, in the corner posts and thereby secured. The concave B, is secured in circular grooves in the sides of the frame; the portion of the concave that is secured to the upper half L, of the sides, which are made fast to the top covering of the frame, can be removed with the same.

The rubbers C, C, I make of a wedge form as represented in Fig. 4, tapering from their backs to their front edges, and also tapering from their base to their ends; or I make them of the form represented in Fig. 5, straight on their backs, and tapering to their front edges. The faces or sides of the rubbers are fluted or grooved, as shown in Fig. 4, or are cross grooved forming projecting teeth or points as shown in section K, Fig. 5. The rubbers C, C, are secured to the concave B, and to the cylinder A, which revolves in the same, in such a manner that the front edge of each rubber placed on the cylinder, will pass between the front edges of the rubbers placed in the concave. I construct the rubbers generally of such proportions as to give half an inch space between the front edges of the rubbers on the cylinder and concave, diminishing to a quarter of an inch space between the corners of their backs, as they pass each other by the revolution of the cylinder. The clover seed or rice is rubbed out of the hull, between the rubbers on the cylinders and concave.

When the form of rubbers represented in Fig. 5, are made use of, the distance between the rubbers on the cylinder and concave can be increased or diminished by raising or lowering the cylinder.

Fig. 6, is a form of rubber that can be made use of the sides to be fluted, grooved, or cross grooved or channeled. D, is a hopper in which the clover seed or rice in the hull is placed, to be acted upon as it falls between the rubbers in the concave and cylinder. E, is the discharge aperture. H, is a driving pulley, and G, is a pulley on the shaft of cylinder A.

What I claim as my invention and desire to secure by Letters Patent, is—

The manner in which the projecting rubbers C, C, in the concave B, and on the cylinder A, are combined and operate with each other, viz: their backs being broad (either straight or wedge shaped) and their roughened sides tapering to a sharp edge at their fronts, are placed in the concave and on the cylinder, in such a position that the front edges of the revolving rubbers on the cylinder, will pass between the front sharp edges of the rubbers in the concave; the clover seed or rice being hulled by the action of the oblique sides of the rotary rubbers, passing between the oblique sides of the stationary rubbers substantially as herein set forth.

MARTIN H. MANSFIELD.

Witnesses:
  Z. C. ROBBINS,
  WM. COOPER.